United States Patent
Chen et al.

(10) Patent No.: US 8,802,052 B2
(45) Date of Patent: Aug. 12, 2014

(54) METHOD FOR HYDROGEN PRODUCTION USING ROTATING PACKED BED

(75) Inventors: Wei-Hsin Chen, Kaohsiung (TW); Yu-Jhih Syu, Kaohsiung (TW)

(73) Assignee: Wei-Hsin Chen, Kaohsiung (TW)

( * ) Notice: Subject to any disclaimer, the term of this patent is extended or adjusted under 35 U.S.C. 154(b) by 813 days.

(21) Appl. No.: 13/052,809

(22) Filed: Mar. 21, 2011

(65) Prior Publication Data

US 2012/0039795 A1    Feb. 16, 2012

(30) Foreign Application Priority Data

Aug. 12, 2010   (TW) ................. 99126920 A

(51) Int. Cl.
*C01B 3/16* (2006.01)
*C01B 3/02* (2006.01)
*B01J 8/00* (2006.01)

(52) U.S. Cl.
CPC ........... *C01B 3/16* (2013.01); *C01B 2203/1011* (2013.01); *C01B 2203/0283* (2013.01); *C01B 2203/1076* (2013.01)
USPC ........ 423/655; 423/648.1; 423/656; 252/373; 48/128; 502/345

(58) Field of Classification Search
CPC .............. C01B 3/02; C01B 3/16; C01B 3/26; C01B 2203/0233; C01B 2203/0283; C01B 2203/1011; C01B 2203/1076
USPC .......... 252/373, 188.25; 423/648.1, 650–652, 423/655–656; 48/61, 128; 502/345
See application file for complete search history.

(56) References Cited

U.S. PATENT DOCUMENTS

| | | | |
|---|---|---|---|
| 4,976,940 A * | 12/1990 | Paulson | 423/648.1 |
| 6,838,063 B2 * | 1/2005 | Kondo et al. | 422/209 |
| 7,361,199 B2 * | 4/2008 | Gittleman et al. | 48/197 R |
| 8,551,444 B2 * | 10/2013 | Agnihotri et al. | 423/648.1 |

* cited by examiner

*Primary Examiner* — Stanley Silverman
*Assistant Examiner* — Kallambella Vijayakumar
(74) *Attorney, Agent, or Firm* — Abe Hershkovitz; Hershkovitz & Associates, PLLC

(57) ABSTRACT

The method in accordance with the present invention has steps of: preparing a hydrogen producing device with a high gravitational rotating packed bed, initiating the device, adjusting the temperature of the device, inputting a reagent gas and a liquid vaporized for mixing with the reagent gas into a reagent mixture, and passing the reagent mixture through the device to obtain hydrogen.

9 Claims, 7 Drawing Sheets

METHOD FOR HYDROGEN PRODUCTION USING ROTATING PACKED BED

BACKGROUND OF THE INVENTION

1. Field of the Invention

The present invention relates to a method for hydrogen production using a rotating packed bed, especially to a method using a rotating packed bed having a single channel or multiple channels and providing high gravity field by rotating. Under suitable operation conditions, said method enhances the mass transportation and the reaction thereof in order to achieve efficient production of hydrogen.

2. Description of the Prior Art

A traditional packed bed tower is a common separation device used in chemistry industry in contacting procedures between gaseous and liquid phases, such as distillation, absorption, desorption or air-stripping. Commonly, the packed bed tower is built as a large cylinder up to several meters in height. The packed bed tower is equipped therein with a large amount of packing material for increasing contact area between gaseous and liquid phases. Since the mass transportation between the gaseous and liquid phases are driven merely by the gravity, this leads to slow progressing of liquid membrane, small contact area, low mass transportation factor as well as the necessity of employing a packed bed of large volume for achieving a required separation efficiency. A separation process carried out with the traditional packed bed tower consumes more energy and costs more on facilities and space requirements. It is thus apparent that traditional packed bed towers need to be improved to raise separation efficiency, lower energy consumption and reduce space occupied.

When the foregoing traditional packed bed tower is in use, besides the characteristics of mass transportation and the flows, density and viscosity of interchanging fluids, the characteristics of the packing materials, packing conformation, specific surface area, porosity and gravitational acceleration also affect the process.

Traditional practices adjust the characters of the fluids, the characters of the packing materials and conditions for operating the fluids to reduce the possibility of overflow. Contrary to the traditional practices, an increase in gravitational acceleration in the packed bed may effectively reduce the possibility of overflow and lead to higher separation efficiencies. Thus high gravitational rotating packed bed is employed. Generally, a conventional practice uses a high gravitational field generated by rotation to decrease the occurrence of overflow and allow larger scale airflow operations, or in other words, larger through put. Furthermore, accelerated gaseous-liquid backflows in turn shorten the time for reaching a balance between the gaseous and liquid phases and allow a better mixing level that increases effective contact area between the gas-liquid and the packing materials, which also provides thinner liquid membranes formed in the pores, an increased mass transportation factor as well as increased separation efficiencies. The high gravitational rotating packed bed has various advantages, especially small size, high efficiency, low energy consumption, short retaining time and large through put and thus may be widely used in process including steps of mass transportation controlling, for example, distillation, absorption, desorption, air-stripping or gaseous-liquid reaction with diffusion control. The high gravitational rotating packed bed may also drastically reduce space necessary for a plant compared with plants that use the traditional packed bed tower.

On the other hand, the abusing of fossil fuel since the industrial revolution not only reduces the reserve thereof but also keeps increasingly destroying the ecological environment. Recently, large amount of carbon dioxide released to and accumulated in the atmosphere has caused serious greenhouse effect and global warming resulting in abnormalities of global climate. Being aware of the issues involving environmental protection, including stopping global warming and mitigating greenhouse effect, which are recognized by the international community as a crucial matter, developed countries are urged to seek alternative and renewable energies, in order to cease releasing carbon dioxide, the unpleasant side-product of nonrenewable energies.

Alternative and renewable energies in research include: solar energy (photoelectrical and thermal energy), wind power, hydroelectric power, biomass energy (biomass diesel fuel, biomass alcohol and marsh gas), ocean energy and hydrogen power. Among the foregoing energies, hydrogen power is specifically discussed for its cleanliness, purity, transportability, energy density and sustainability and thus known as a "green energy." Available methods for hydrogen production include: 1) thermochemical methods, 2) electrochemical methods, 3) photoelectric methods and 4) bioelectrical methods. Currently, the primary practical methods for hydrogen production are thermochemical and include: steam reforming, partial oxidation, autothermal reforming, gasification, water gas shift reaction and pyrolysis.

Among the aforementioned thermochemical methods for hydrogen production, the water gas shift reaction allows a carbon monoxide gas or a mixture of carbon monoxide gas and hydrogen gas, i.e., a syngas, to react with steam with catalyst to obtain hydrogen from steam, wherein the carbon monoxide is turned to carbon dioxide. A conventional reactor for hydrogen production provides thermal energy by burning or with electricity. Recent research provides a microwave reactor that uses microwave radiation to initiate water gas shift reaction and methanol vapor reforming, and also a Swiss roll reactor that uses thermal circulation and thermorecycling to produce hydrogen at an improved efficiency, demonstrating the research value and practical value of developing new reactors for hydrogen production.

The high gravitational rotating packed bed generates a high gravitational field in the rotating packed bed by means of centrifugation. The reagents in said high gravitational field is highly separated in order to increase contact area as well as the collision probability between the reagents, so as to achieve rapid mixing and reaction. As set forth above, the packed bed is widely used for distillation, absorption, desorption, air-stripping or gaseous-liquid reaction with diffusion control. However, the aforementioned processes are carried out with low-temperature gaseous-liquid systems whose operating temperatures are often at room temperature and are not practical under high-temperature gaseous conditions or applicable in a hydrogen production process. Hydrogen energy development is a promising industry. Application of high gravitational rotating packed bed in hydrogen production is expected to feature large through put, reduced space requirement, high mass transportation rate, low energy consumption and low cost, revealing characteristics of a device and technology with vast potential.

Furthermore, the aforementioned rotating packed bed is filled with catalysts so as to form a complete ring. Such structure requires large amounts of catalysts and drastically raises the cost when expensive catalysts are used.

To overcome the shortcomings, the present invention provides a method for hydrogen production to mitigate or obviate the aforementioned problems.

SUMMARY OF THE INVENTION

The main objective of the invention is to provide a method for hydrogen production, which mitigates or obviates the shortcoming of conventional hydrogen producing reactors that the immobilized catalyst bed through which reagents pass has a low mass transportation rate.

The method in accordance with the present invention has steps of: preparing a hydrogen producing device with a high gravitational rotating packed bed, initiating the device, adjusting the temperature of the device, inputting a reagent gas and a liquid vaporized for mixing with the reagent gas into a reagent mixture, and passing the reagent mixture through the device to obtain hydrogen.

The high gravitational rotating packed bed used in the device is rotatable and has a rotating packed bed having a catalyst bed forming one or more than one channels so as to effectively facilitate collisions between reagents and mass transportation rate between the reagents and the catalysts under a high gravitational field generated by rotation of the catalysts bed, which greatly raises reagent conversion rate and the production of hydrogen.

Specifically, the device has an inlet, a reactor, an annular heating unit, a rotation controller and an outlet. The inlet controls the input of reagents to the reactor. The rotating packed bed of the reactor is filled with catalysts for inducing water gas shift reaction for hydrogen production. The annular heating unit is for heating the rotating packed bed and controlling operating temperature. The rotation controller uses a rotary motor to rotate the rotating packed bed and control the rotating speed thereof. The outlet outputs a product gas out of the device to further process the collection and analysis of the product gas and an evaluation of the reaction.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
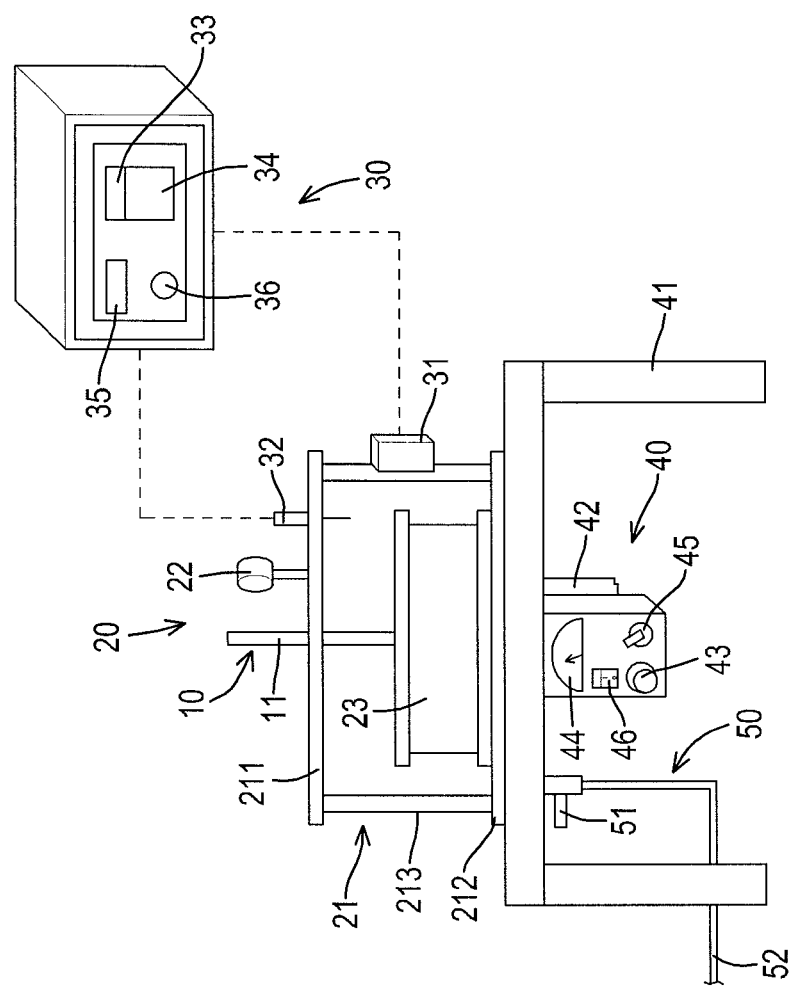
FIG. 1 is a schematic perspective view of the device used in the method in accordance with the present invention.
Figure 4:
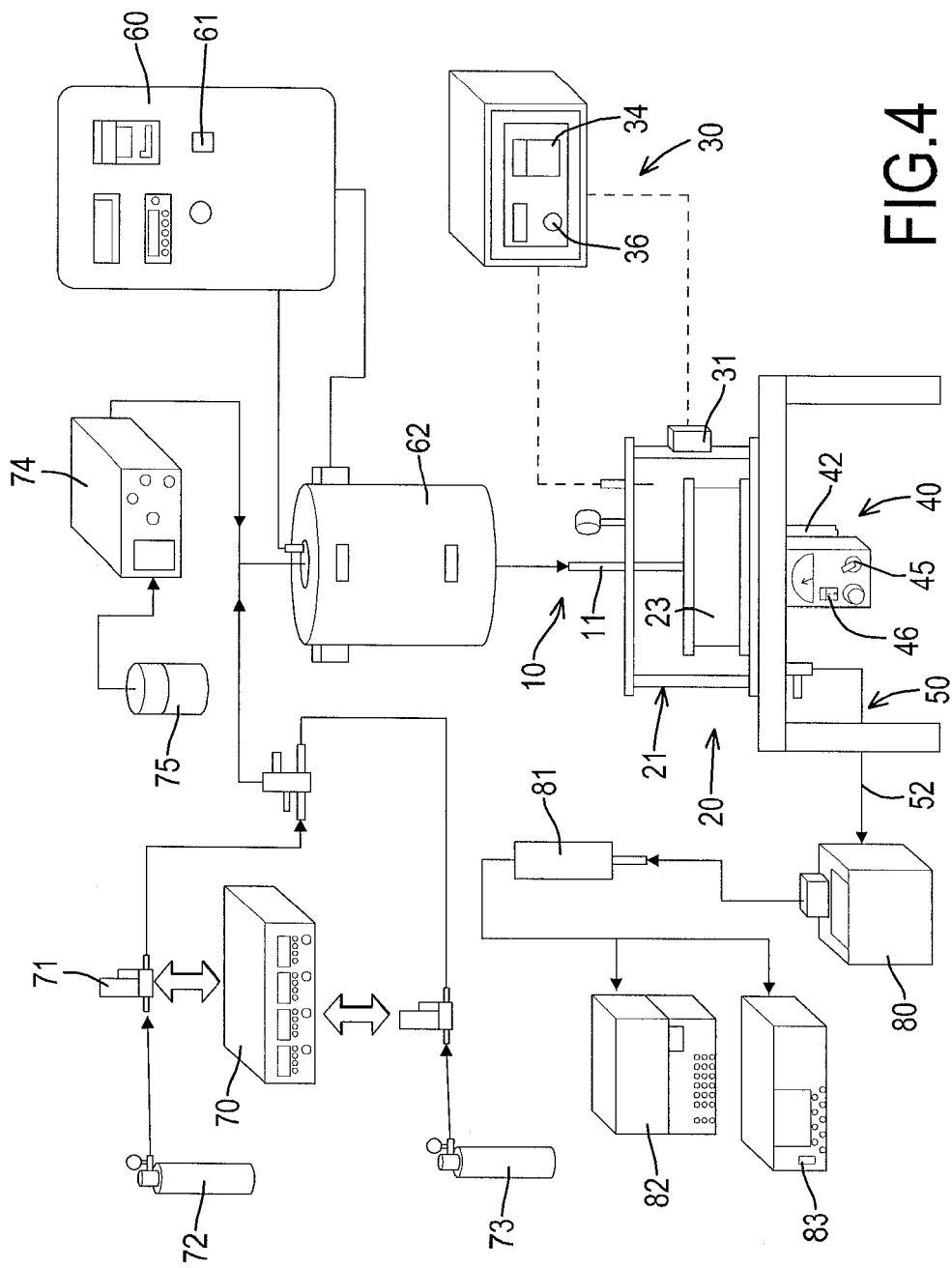
FIG. 4 is a schematic perspective view of an embodiment of the device in FIG. 1 for inducing water gas shift reaction for hydrogen production.

With reference to FIGS. 1 and 4, a method in accordance with the present invention comprises preparing a hydrogen producing device 1 with a high gravitational rotating packed bed and operation of the device 1 to obtain hydrogen.

The hydrogen producing device 1 with a high gravitational rotating packed bed comprises an inlet 10, a reactor 20, an annular heating unit 30, a rotation controller 40 and an outlet 50. Preferably, the device further comprises a condenser 80, a dryer 81, a gas chromatography 82 and a gas analyzer 83.

The inlet 10 comprises a gas input duct 11 and a preheater 62. Preferably, the inlet 10 further comprises a preheater controller 60, a flow rate controller 70, an electronic flow meter 71 and a liquid pump 74. The preheater controller 60 comprises a preheater power switch 61. The gas input duct 11 forms a single channel entrance and comprises a top end, a bottom end and an outer surface. Preferably, the gas input duct 11 is metal and high-temperature endurable. More preferably, the gas input duct 11 further comprises heating elements or insulating materials formed on the outer surface of the gas input duct 11 in order to keep a high temperature of reagents inside the gas input duct 11. The preheater 62 is functionally connected to the top end of the gas input duct 11.

Figure 3:
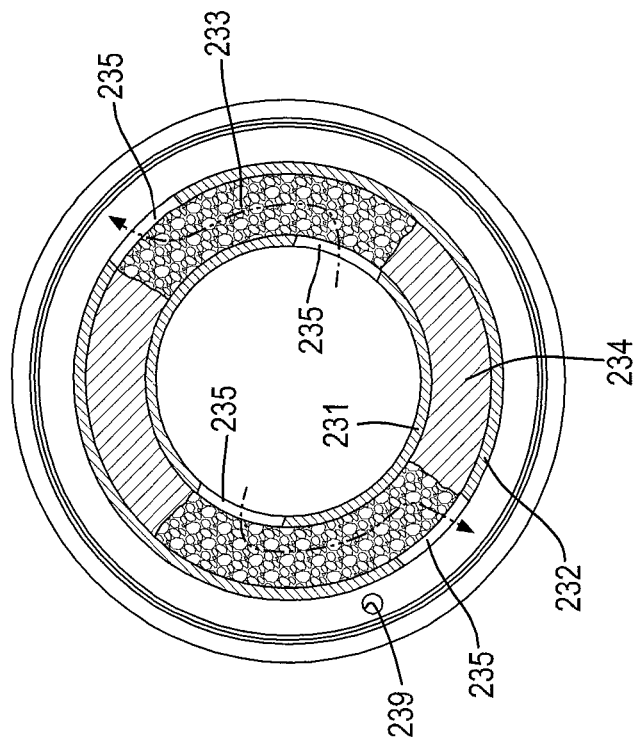
FIG. 3 is a top view in partial section of another embodiment of a rotating packed bed of the device in FIG. 1 comprising a catalyst bed forming multiple channels.
Figure 2:
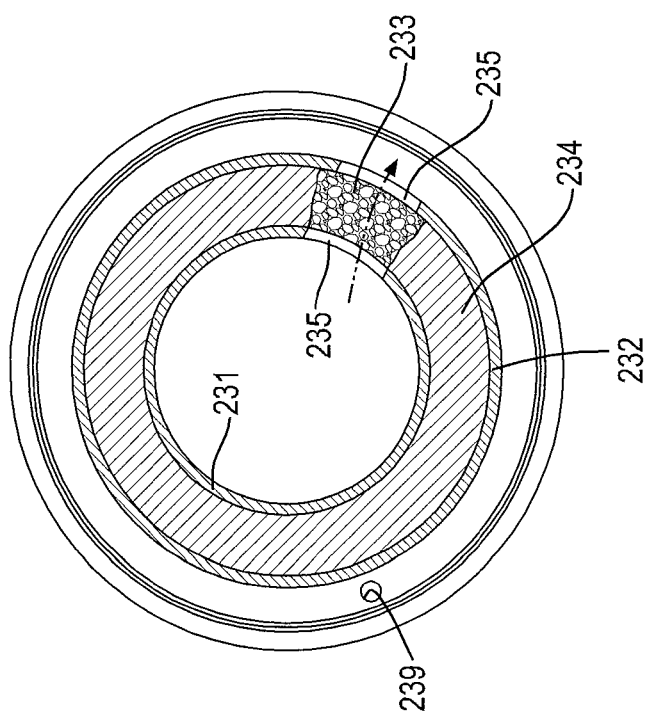
FIG. 2 is a top view in partial section of an embodiment of a rotating packed bed of the device in FIG. 1 comprising a catalyst bed forming a single channel.

The reactor 20 is functionally connected to the bottom end of the inlet 10 and comprises a tank 21, a pressure gauge 22 and a rotating packed bed 23. The tank 21 may be made of a stainless metal that endures high temperature and comprises a top lid 211, a bottom lid 212 and a housing 213. The pressure gauge 22 is for monitoring the pressure within the tank 21. The rotating packed bed 23 is received in the tank 21. With reference to FIG. 2, an embodiment of the rotating packed bed 23 comprises an inner ring 231, an outer ring 232, a catalyst 233, an impermeable layer 234, multiple air holes 235 and at least one outlet hole 239. Preferably, the outer ring 232 is rotatable and metallic. The catalyst 233 is filled between the inner ring 231 and the outer ring 232 and forms a catalyst bed. The catalyst bed forms at least one catalytic channel communicating with the inner ring 231 and the outer ring 232. The size of the catalyst bed is adjustable by rotating the outer ring 232 so as to alter the size of a reaction space and to adjust the retaining time of reagents within the catalyst bed. With reference to FIG. 3, the catalyst bed may be size-adjustable and forms multiple channels allowing reagents to pass through the catalyst 233. The impermeable layer 234 is formed with an airtight material filled in the rest of the space between the inner ring 231 and the outer ring 232. The air holes 235 are formed on the inner ring 231 and the outer ring 232 allowing reagents to pass through the catalyst 233 in order to induce chemistry reactions. The at lease one outlet hole 239 is formed out side the out ring 232 for receiving the reagents from the air holes 235 and further guiding the reagents outward of the rotating packed bed 23.

The annular heating unit 30 is for heating and controlling the temperature of the tank 21 of the reactor 20 and comprises an annular heater 31, a thermo sensor 32, a temperature adjuster 33, a power adjuster 34, a power monitor 35 and a power switch 36. The annular heater 31 is for heating and keeping the temperature of the tank 21 of the reactor 20 so that inside the tank 21 a reaction temperature is high enough for necessary reactions. The thermo sensor 32 may be a thermocouple for detecting the reaction temperature and providing comprehensible electronic signals. The temperature adjuster 33 is for adjusting the reaction temperature. The power adjuster 34 is for adjusting power output according to the electronic signals provided by the thermo sensor 32 in order to heat the tank 21 to a required temperature. The power monitor 35 is for displaying the power output. The power switch 36 is for controlling a power supply to the annular heating unit 30.

The rotation controller 40 is for controlling the rotation of the rotating packed bed and comprises a base frame 41, a rotary motor 42, a rotating speed controller 43, a tachometer 44, a three-stage rotation controller 45 and a motor power switch 46. The base frame 41 may be metallic and is used to support and hold the reactor 20.

The rotary motor 42 is used to rotate the rotating packed bed 23. The rotating speed controller 43 is for adjusting a rotating speed at which the rotary motor 42 rotates the rotating packed bed 23. The tachometer 44 is for displaying the rotating speed of the rotating packed bed 23. The three-stage rotation controller 45 is for controlling the rotary motor 42 to rotate, to reverse or to stop. The motor power switch 46 is used to control a power supply to the rotary motor 42.

The outlet 50 is communicated with the rotating packed bed 23 and comprises an exhaustion valve 51 and an exhaustion duct 52. The exhaustion valve 51 is used to discharge the gas received in the tank 21 and control the pressure of the device 1. Specifically, the exhaustion duct 52 is communicated with the aforementioned outlet hole 239. The exhaustion duct 52 is for outputting a product gas out of the device 1 to further process the collection and analysis of the product gas and an evaluation of the reaction.

For operating the aforementioned device 1, it is preferred to wash the device and to test the impermeability of the device 1 with hydrogen prior to operation.

With reference to FIG. 4, the preheater 62, the annular heating unit 30 and the rotary motor 40 are then initiated. Preferably, the preheater power switch 61 of the preheater controller 60, the power switch 36 of the annular heater 31 and the motor power switch 46 are turned on to initiate the preheater 62, the annular heating unit 30 and the rotary motor 40.

The temperatures of the preheater 62 and the tank 21 of the reactor 20 and the rotating speed of the rotary motor 40 are then adjusted.

When the temperatures of the preheater 62 and the tank 21 reach the preset temperatures, a reagent gas 72, a carrier gas 73 and a liquid 75 are input to the preheater 62 while controlling the flow rates of the reagent gas 72, the carrier gas 73 and the liquid 75 so as to allow vaporization of the liquid 75 into a steam mixed with the reagent gas 72, which generates a reagent mixture. The reagent gas 72 may be carbon monoxide or a mixture of carbon monoxide gas and hydrogen gas with which to produce a product gas having higher hydrogen concentration than the hydrogen concentration of said mixture. Preferably, the flow rates of the reagent gas 72 and the carrier gas 73 are controlled with the aforementioned flow rate controller 70 and the electronic flow meter 71 into the preheater 62. The liquid 75 is controlled with the aforementioned liquid pump 74 into the preheater 62 in which the liquid 75 is vaporized into a steam. The steam is mixed with the reagent gas 72 into a reagent mixture.

The reagent mixture is input through the inlet 10 to the tank 21 of the reactor 20, and then passed through the catalyst bed of the rotating packed bed 23 undergoing water gas shift reaction with the high gravitational field, high temperature and catalyst 233 to obtain a product gas, i.e., hydrogen. Preferably, the reagent mixture contacts the catalyst of the catalyst bed for at least 0.01 second.

Preferably, the product gas is led through the exhaustion duct 52 of the outlet 50 to the condenser 80 for removing the moisture in the product gas. The product gas processed with the condenser 80 is led to the dryer 81 for further removing moisture in order to protect the gas chromatography 82 and the gas analyzer 83 to which the product gas is then led. The concentrations of carbon monoxide, carbon dioxide, hydrogen gas and methane are measured and analyzed with the gas chromatography 82 in order to assess the yield hydrogen production via water gas shift reaction.

The present invention is more thoroughly described with an example following below, which is for describing the present invention and in no aspect limiting the scope thereof.

Figure 5:
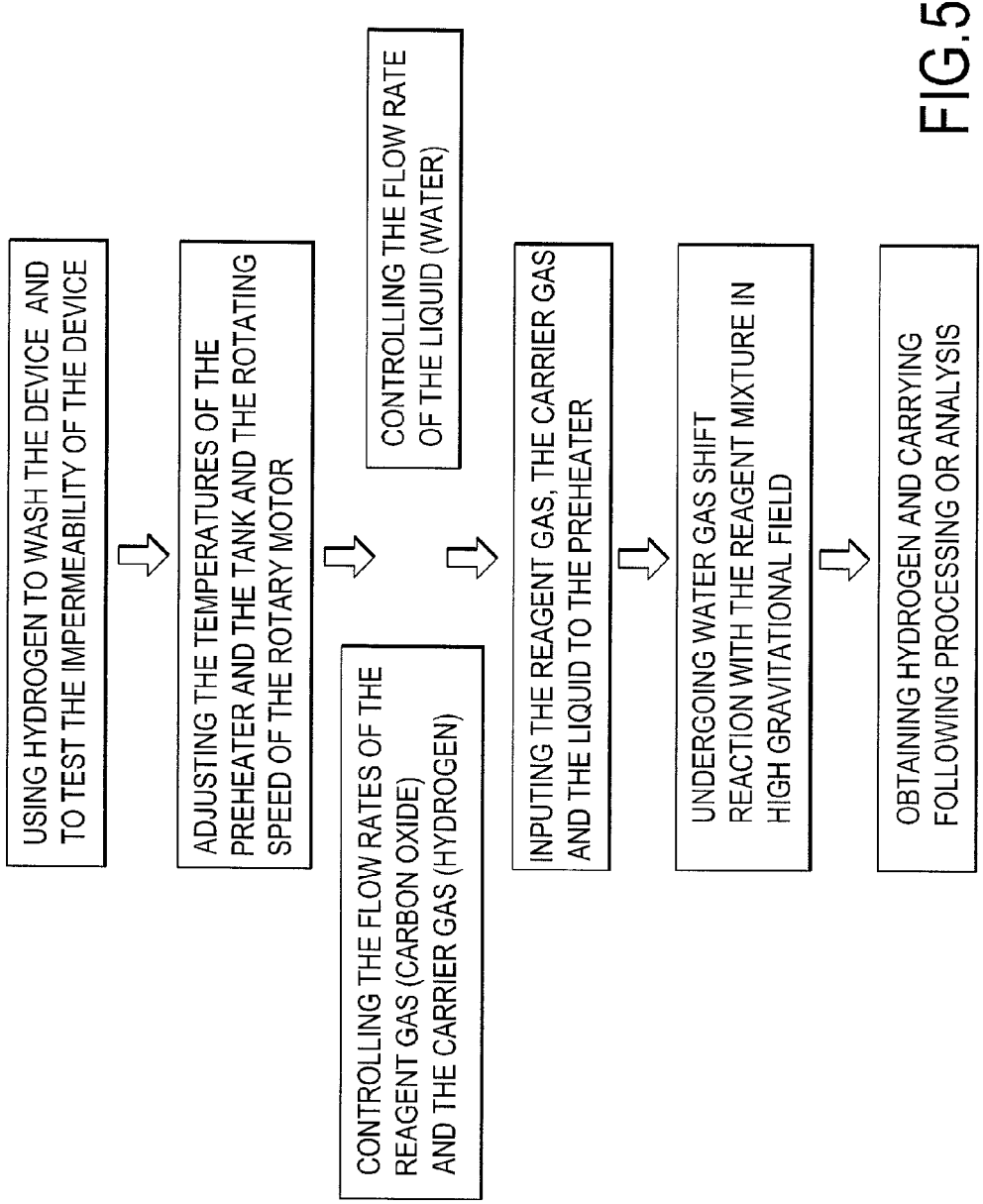
FIG. 5 is a flowchart of the method in accordance with the present invention for inducing water gas shift reaction for hydrogen production.

With reference to FIGS. 4 and 5, in the example of the method in accordance with the present invention, water gas shift reaction is carried out using the hydrogen producing device 1 with a high gravitational rotating packed bed in order to produce hydrogen from steam and carbon monoxide.

Prior to operation, hydrogen is employed to wash the device 1 and test the impermeability of the device 1. The preheater 62 and the tank 21 of the reactor 20 are then preheated to 300° C. The rotating speed of the rotary motor 40 is adjusted to a preset value. The liquid 75, which is water in the instant example, is input with the liquid pump 74 through the preheater 62 at a fixed volumetric flow rate of 0.3 cc/min. Meanwhile, the electronic flow meter 71 and the flow rate controller 70 is used to control the flow rates of the reagent gas 72 and the carrier gas 73, which are respectively carbon monoxide and hydrogen in the instant example so as to mix and lead the reagent gas 72 and the carrier gas 73 to the preheater 62. Preferably, the reagent gas 72 and the carrier gas 73 are mixed in a gas mixer. More preferably, the ratio of the volumetric flow rates of the carbon monoxide and the water is from 1:1 to 1:10. The foregoing carrier gas 73, as described above, being hydrogen, is used to aid the flowing of the liquid, i.e., water, and to control the retaining time of reagents in the catalyst 233 of the catalyst bed. After the water gas shift reaction, the product gas, which comprises hydrogen of higher concentration than the reagent gas 72, is further condensed and dried with for example the aforementioned condenser 80 and the dryer 81 so as to remove residue moisture, and may be further analyzed with instruments, e.g., the aforementioned gas chromatography 82 and gas analyzer 83. The catalyst 233 used in the instant example is categorized to granular copper-zinc catalysts, whose main component, as shown in Table 1, is capable of inducing water gas shift reaction.

One preferred embodiment of the catalyst 233 includes 42 wt % copper oxide, 10 wt % aluminum oxide and 18 wt % zinc oxide.

TABLE 1

| Component | Weight-weight percentage (%) |
| --- | --- |
| Copper oxide | 40-44 |
| Aluminum oxide | 7-13 |
| Zinc oxide | 44-50 |

Figure 7:
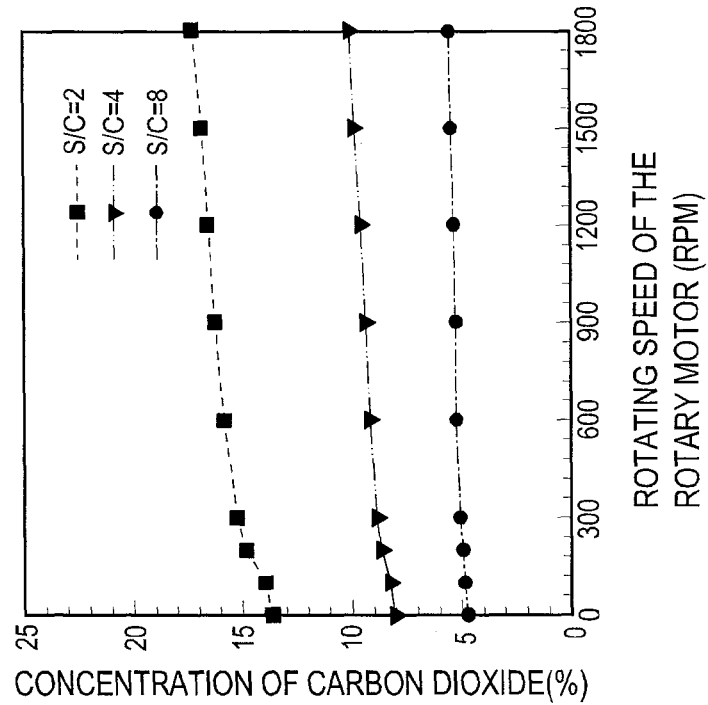
FIG. 7 is a chart showing the distribution of carbon dioxide concentrations after water gas shift reaction.
Figure 6:
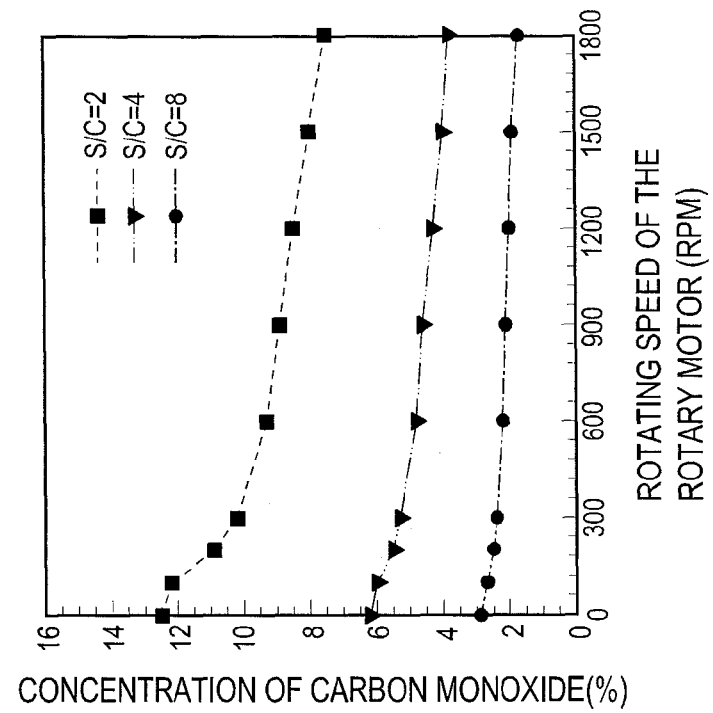
FIG. 6 is a chart showing the distribution of carbon monoxide concentrations after water gas shift reaction.
Figure 8:
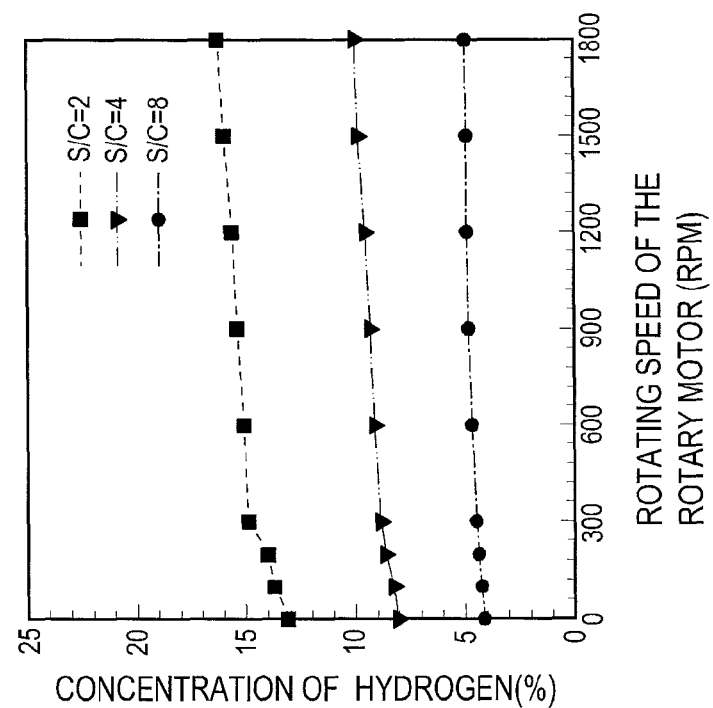
FIG. 8 is a chart showing the distribution of hydrogen concentrations after water gas shift reaction.

With reference to FIG. 6, when operating the device 1 following the steps, the rotating speed are adjusted at 0, 100, 200, 300, 600, 900, 1200, 1500 or 1800 rpm (revolutions per minute) while the molar ratio of steam and carbon monoxide within the catalyst bed is 2:1, 4:1 or 8:1. The S/C ratio, i.e., the number of moles of steam divided by that of carbon monoxide, is 2, 4 or 8. As shown in FIG. 6, the concentration of carbon monoxide decreases along with the increase of the rotating speed of the rotary motor 40. With reference to FIGS. 7 and 8, the concentrations of carbon dioxide and hydrogen raise directly with nearly the same tendency to the rotating speed of the rotary motor 40 increasing from 0 rpm to 1800 rpm.

Figure 9:
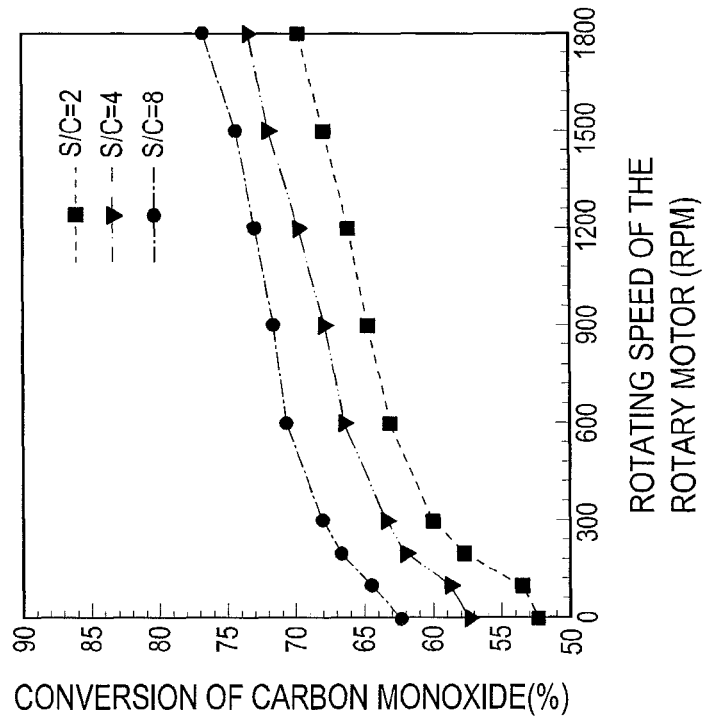
FIG. 9 is a chart showing the distribution of carbon monoxide conversion after water gas shift reaction.
Figure 10:
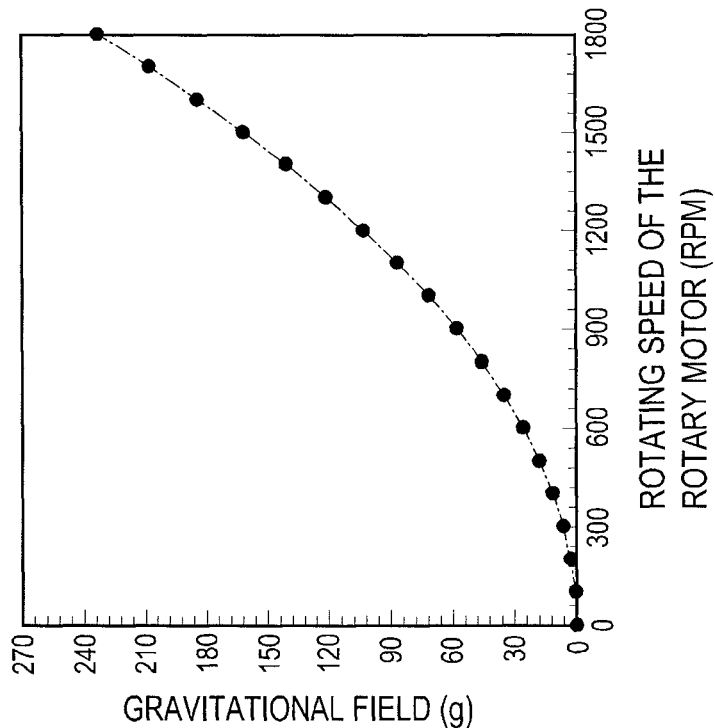
FIG. 10 is a chart showing the distribution of enhancing factor of carbon monoxide conversion.
Figure 11:
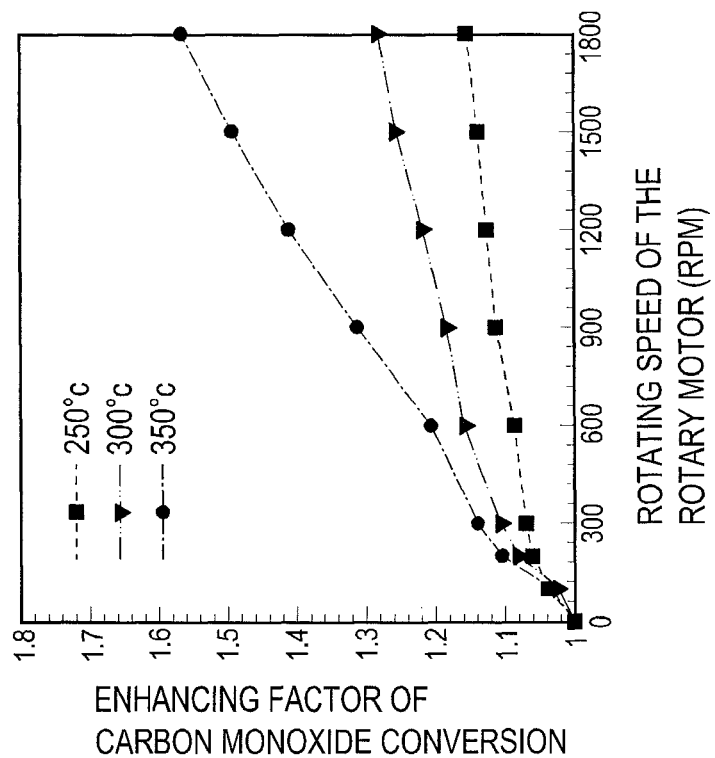
FIG. 11 is a chart showing the distribution of the gravitational field in the high gravitational rotating packed bed of the device versus the rotating speed of the rotary motor.

Based on the chemical equation of water gas shift reaction, a low carbon monoxide concentration and high carbon dioxide and hydrogen concentrations lead to better yield of the water gas shift reaction. FIGS. 6, 7 and 8 have shown the distribution of the concentration of carbon monoxide, carbon dioxide and hydrogen. FIG. 9 demonstrates the distribution of carbon monoxide conversion in three conditions characterized by three S/C ratios. Generally, as shown in FIG. 9, it is clear that raising the rotating speed of the rotary motor 40 in turn raises the conversion of carbon monoxide. In other words, the method in accordance with the present invention that employs the device 1 increases yield of hydrogen production by raising the rotating speed of the rotary motor 40 that generates a high gravitational field. With reference to FIG. 9, it is to be noted that the conversion of carbon monoxide rises along the steepest slope in the interval that the rotating speed of the rotary motor 40 is from 0 rpm to 600 rpm. FIG. 10 shows, under the condition that S/C ratio=4, and the reaction temperature is 250° C., 300° C. or 350° C., the enhancing factor of carbon monoxide conversion, wherein the enhancing factor of carbon monoxide conversion is defined as the ratio of carbon monoxide conversion at a given rotating speed to the carbon monoxide conversion when rotating speed is 0. With reference to FIG. 10, it is apparent that the enhancing factor of carbon monoxide conversion increases directly with the rotating speed of the rotary motor 40. Such tendency is most significant under the condition that the reaction temperature is 350° C. and when the rotating speed of the rotary motor 40 increases from 0 rpm to 1800 rpm, wherein the yield of hydrogen increases by 58%. The gravitational field relative to the rotating speed of the rotary motor 40 is shown in FIG. 11. When the rotating speed of the rotary motor 40 increases from 0 rpm to 1800 rpm, the gravitational field generated and applied to the reagents in the rotating packed bed 23 increases to 234 g.

According to the foregoing description, the method in accordance with the present invention uses a hydrogen producing device with a high gravitational rotating packed bed to induce water gas shift reaction in the catalyst bed under a high gravitational field generated by rotation. The use of the high gravitational field helps enhance mass transportation so as to facilitate contact between and collision of steam and carbon monoxide and lead to high yield of hydrogen, which in turn enables clean energy production and reduces hazards to the environment.

What is claimed is:

1. A method for hydrogen production comprising
   1) preparing a hydrogen producing device comprising
      (a) an inlet comprising
         a preheater;
      (b) a reactor comprising
         a tank;
         a rotating packed bed comprising
            an inner ring;
            an outer ring; and
            a catalyst bed forming at least one catalytic channel communicating with the inner ring and the outer ring and comprising
               a catalyst;
      (c) an annular heating unit for heating and controlling the temperature of the tank of the reactor;
      (d) a rotation controller for controlling the rotation of the rotating packed bed and comprising
         a rotary motor; and
      (e) an outlet is communicated with the rotating packed bed;
   2) using hydrogen to wash the device and to test the impermeability thereof;
   3) initiating the preheater, the annular heating unit and the rotary motor;
   4) adjusting the temperature of the preheater, adjusting the temperature of the tank of the reactor and adjusting the rotating speed of the rotary motor;
   5) inputting a reagent gas, a carrier gas and a liquid to the preheater while controlling the flow rates thereof so as to allow vaporization of the liquid into a steam mixed with the reagent gas, which generates a reagent mixture;
   6) inputting the reagent mixture through the inlet to the tank of the reactor; and
   7) passing the reagent mixture through the rotating packed bed undergoing water gas shift reaction to obtain hydrogen.

2. The method as claimed in claim 1, wherein
in step 4), the temperatures of the preheater and the tank of the reactor are 180-550° C. and the rotating speed of the rotary motor is less than 1800 rpm.

3. The method as claimed in claim 1, wherein
in step 5), the reagent gas is carbon monoxide and the liquid is water.

4. The method as claimed in claim 3, wherein
the ratio of the volumetric flow rates of the carbon monoxide and the water is from 1:1 to 1:10.

5. The method as claimed in claim 1, wherein
in step 5), the reagent gas is a mixture of carbon monoxide gas and hydrogen gas and the liquid is water.

6. The method as claimed in claim 1, wherein
in step 7), the reagent mixture contacts the catalyst of the catalyst bed for at least 0.01 second.

7. The method as claimed in claim 1, wherein
the reactor further comprises
   a pressure gauge; and
the outer ring is rotatable and metallic for adjusting the size of the catalyst bed by rotation of the outer ring.

8. The method as claimed in claim 1, wherein
the annular heating unit comprises
   an annular heater;
   a thermo sensor;
   a temperature adjuster;
   a power adjuster;
   a power monitor; and
   a power switch.

9. The method as claimed in claim 1, wherein
the rotation controller comprises
   a base frame;
   a rotating speed controller;
   a tachometer;
   a three-stage rotation controller; and
   a motor power switch.

* * * * *